United States Patent
Yamagata

(10) Patent No.: US 10,023,331 B2
(45) Date of Patent: Jul. 17, 2018

(54) CONTINUOUS CONVEYING TYPE BAG FILLING AND PACKAGING MACHINE

(71) Applicant: Toyo Jidoki Co., Ltd., Minato-ku, Tokyo (JP)

(72) Inventor: Akihiro Yamagata, Iwakuni (JP)

(73) Assignee: Toyo Jidoki Co., Ltd., Minato-ku (JP)

( * ) Notice: Subject to any disclaimer, the term of this patent is extended or adjusted under 35 U.S.C. 154(b) by 899 days.

(21) Appl. No.: 13/865,793

(22) Filed: Apr. 18, 2013

(65) Prior Publication Data
US 2013/0298499 A1 Nov. 14, 2013

(30) Foreign Application Priority Data

May 9, 2012 (JP) ................................. 2012-107604

(51) Int. Cl.
| | | |
|---|---|---|
| B65B 1/32 | (2006.01) | |
| B65B 39/14 | (2006.01) | |
| B65B 57/14 | (2006.01) | |
| G01G 19/393 | (2006.01) | |
| G01G 13/08 | (2006.01) | |

(Continued)

(52) U.S. Cl.
CPC .............. *B65B 1/32* (2013.01); *B65B 39/145* (2013.01); *B65B 57/14* (2013.01); *G01G 13/02* (2013.01); *G01G 13/024* (2013.01); *G01G 13/06* (2013.01); *G01G 13/08* (2013.01); *G01G 13/18* (2013.01);

(Continued)

(58) Field of Classification Search
None
See application file for complete search history.

(56) References Cited

U.S. PATENT DOCUMENTS 2,381,505 A * 8/1945 Lindholm ............. B65B 57/145
111/38
3,156,311 A * 11/1964 Olofsson ................ G01G 13/00
177/55

(Continued)

FOREIGN PATENT DOCUMENTS

JP 2001-72004 A 3/2001
JP 2002-255119 A 9/2002

(Continued)

*Primary Examiner* — Hemant M Desai
*Assistant Examiner* — Mobeen Ahmed
(74) *Attorney, Agent, or Firm* — Norton Rose Fulbright US LLP

(57) ABSTRACT

A continuous conveying type bag filling and packaging machine including multiple groups of grippers (2) continuously traveling along a racetrack-shaped annular path and, as the grippers (2) complete a single revolution, carries out various packaging operations, wherein a measuring hopper (42) is provided above each elevating hopper (37) and is continuously rotated in conjunction therewith. The measuring hopper (42) has a shutter (44). A weight detector (46), along with a shutter actuation mechanism (47), is provided so as to correspond to each measuring hopper (42) and is continuously rotated in conjunction therewith. If, based on a detection signal from the weight detector (46), it is determined that the weight of the material to be packaged that is supplied to the measuring hopper (42) exceeds the upper limit value of the allowable range, the corresponding shutter actuation mechanism (47) is not actuated, and the shutter (44) is maintained closed.

3 Claims, 5 Drawing Sheets

(51) Int. Cl.
*G01G 13/02* (2006.01)
*G01G 19/387* (2006.01)
*G01G 13/18* (2006.01)
*G01G 13/06* (2006.01)

(52) U.S. Cl.
CPC ......... *G01G 19/387* (2013.01); *G01G 19/393* (2013.01)

(56) References Cited

U.S. PATENT DOCUMENTS

| | | | | |
|---|---|---|---|---|
| 3,259,199 | A * | 7/1966 | Noble | G01G 19/22 177/210 R |
| 3,275,043 | A * | 9/1966 | Dobbyn | B65B 57/06 141/142 |
| 3,340,679 | A * | 9/1967 | Johnson | B65B 43/32 53/385.1 |
| 3,477,530 | A * | 11/1969 | Garnett | B65B 57/12 177/55 |
| 3,720,276 | A * | 3/1973 | Banks | B65B 1/34 177/122 |
| 3,977,483 | A * | 8/1976 | Greanias | G01G 13/29 177/1 |
| 4,509,313 | A * | 4/1985 | Koppe | B65B 1/02 53/570 |
| 4,614,244 | A * | 9/1986 | Usagawa | G01G 19/32 177/110 |
| 4,666,002 | A * | 5/1987 | Haze | G01G 19/393 177/1 |
| 4,798,039 | A * | 1/1989 | Deglise | B65B 31/02 53/432 |
| 4,928,473 | A * | 5/1990 | Nagao | B65B 1/32 177/58 |
| 5,555,709 | A * | 9/1996 | Savigny | B65B 43/60 141/145 |
| 5,622,025 | A * | 4/1997 | Kitagawa | B65B 5/061 198/403 |
| 5,646,374 | A * | 7/1997 | Stapp | G01G 13/026 177/119 |
| 5,736,683 | A * | 4/1998 | Howard | G01G 19/393 177/105 |
| 5,798,487 | A * | 8/1998 | Goichman | G01G 13/22 177/54 |
| 6,401,437 | B1 * | 6/2002 | Kono | B65B 1/32 53/502 |
| 7,038,145 | B2 * | 5/2006 | Fujii | G01G 19/393 177/105 |
| 7,057,118 | B2 * | 6/2006 | Arnason | G01G 13/08 177/103 |
| 7,579,558 | B2 * | 8/2009 | Higuchi | B65B 1/32 177/25.18 |
| 7,790,990 | B2 * | 9/2010 | Kieselhorst | G01G 19/393 177/25.18 |
| 8,356,455 | B2 * | 1/2013 | Sato | B29C 65/18 53/502 |
| 2002/0158080 | A1 * | 10/2002 | Matsunaga | B32B 18/00 222/94 |
| 2003/0101686 | A1 * | 6/2003 | Savigny | B65B 25/04 53/253 |
| 2004/0164088 | A1 | 8/2004 | Baranowski | |
| 2009/0188209 | A1 * | 7/2009 | Koga | B65B 1/06 53/53 |
| 2009/0223172 | A1 * | 9/2009 | Hirano | B65B 31/042 53/403 |
| 2010/0108404 | A1 * | 5/2010 | Kieselhorst | G01G 19/393 177/25.18 |
| 2010/0132833 | A1 * | 6/2010 | Kawanishi | B65B 1/32 141/98 |
| 2010/0219002 | A1 * | 9/2010 | Nakagawa | B65B 37/18 177/59 |
| 2011/0108470 | A1 * | 5/2011 | Wang | A61J 3/074 209/592 |
| 2015/0308884 | A1 * | 10/2015 | Kawanishi | G01G 13/00 177/59 |

FOREIGN PATENT DOCUMENTS

| | | |
|---|---|---|
| JP | 2002-302227 A | 10/2002 |
| JP | 2002-308223 A | 10/2002 |
| JP | 2009-161230 A | 7/2009 |

* cited by examiner

CONTINUOUS CONVEYING TYPE BAG FILLING AND PACKAGING MACHINE

BACKGROUND OF THE INVENTION

1. Field of the Invention

The present invention relates to a continuous conveying type bag filling and packaging machine that moves multiple grippers along a racetrack-shaped annular path at a constant speed and, in the process of movement of grippers, carries out packaging operations, such as supplying of a bag to the grippers and holding of the bag at two edges with the grippers, opening of the mouth of the bag, filling of the bag with material to be packaged, sealing of the mouth of the bag, and the like.

2. Description of the Related Art

U.S. Pat. No. 4,509,313 discloses a continuous conveying type bag filling and packaging machine, and this bag filling and packaging machine includes multiple groups of grippers disposed at regular intervals and traveling at a constant speed along a racetrack-shaped annular path, a bag supplying apparatus disposed along the annular path, a bag mouth opening apparatus, a filling apparatus, a sealing apparatus, and the like. In this continuous conveying type bag filling and packaging machine, the filling apparatus is provided with a plurality of elevating hoppers, which are disposed above an arcuate (semi-circular) portion on one side of the annular path at regular intervals (regular angular intervals) along a circular path that is concentric with the arcuate portion, and these hopper continuously rotate in synchronism with the grippers. As the grippers travel along the arcuate portion on one side of the annular path, the bags held by the grippers are filled with the material to be packaged through the elevating (rising and lowering) hoppers.

As the grippers continuously travel (rotate) along the arcuate portion on one side of the annular path, the elevating hoppers continuously rotate in synchronism with the grippers. During this continuous rotation, the elevating hopper is lowered from a position directly above a bag held by the grippers (a standby position) to a filling position, and a lower end opening of the hopper is inserted into the mouth of the bag, and then the material to be packaged is deposited into the elevating hopper, falling into the bag through the lower end opening; after this, the hopper is raised, the lower end opening is retracted out of the mouth of the bag, and then the elevating hopper returns to the standby position.

A similar continuous conveying type bag filling and packaging machine is disclosed in Japanese Patent Application Laid-Open (Kokai) No. 2009-161230. In this continuous conveying type bag filling and packaging machine, a continuously rotating guide member, which is raised and lowered in conjunction with the elevating hoppers and continuously rotates, is provided at a position below each elevating hopper. The guide member has a pair of opposed frames that are opened and closed by an air cylinder or other drive means. When the frames are closed, the lower portion of the guide member becomes narrower, and the lower end can be inserted into the mouth of a bag; while, on the other hand, when the frames are opened, the lower end of the guide member is released (opened), and the material to be packaged falls downwardly and fills up the bag.

In the continuous conveying type bag filling and packaging machines described above, a predetermined amount of material to be packaged is supplied to the elevating hoppers for each rotation; and in the synchronized zone (which is a zone wherein the grippers and elevating hoppers rotate in synchronism), the bags held by the grippers are filled with the material to be packaged through the elevating hoppers (or through elevating hoppers and guide members). In certain cases, however, the weight of the material to be packaged that is supplied to an elevating hopper may be either insufficient or excessive.

If the weight of the material to be packaged that is supplied to an elevating hopper is insufficient, the resultant non-compliant bag (which has insufficient filling weight) is removed from the production line during the subsequent steps. However, if the weight of the material to be packaged is excessive, this would cause that the material to be packaged deposited in the bag gets into the seal portion of the bag mouth, spills from the bag mouth, and so on. As a result, later, this may adversely affect subsequent production by operational faults in the sealing apparatus, contamination of the bag filling and packaging machine and the production line during the subsequent steps, and so on.

BRIEF SUMMARY OF THE INVENTION

The present invention is devised by considering the above-described problems of conventional continuous conveying type bag filling and packaging machines, and it is an object of the present invention to proactively prevent problems associated with operational faults in a sealing apparatus or contamination of bag filling and packaging machine and production line during the subsequent steps by way of preventing the material to be packaged from being filled into the bag even when an excessive weight of the material to be packaged is supplied from the filling apparatus.

The above object is accomplished by a unique structure of the present invention for a continuous conveying type bag filling and packaging machine and by an improvement in a continuous conveying type bag filling and packaging machine, wherein the continuous conveying type bag filling and packaging machine includes:

multiple groups of grippers that are provided at regular intervals and travel at a constant speed along a racetrack-shaped annular path, and further, among others, a bag supplying apparatus, a bag mouth opening apparatus, a filling apparatus, and a sealing apparatus, which are provided along the annular path, wherein the filling apparatus is comprised of a plurality of elevating hoppers that are provided, above an arcuate portion on one side of the annular path, at regular intervals along a first circular path concentric with the arcuate portion and that continuously rotate in synchronism with the grippers, and during travel of the grippers, packaging operations including, among others, supplying of a bag to the grippers using the bag supplying apparatus and gripping of two edges of the bag with the grippers, opening of a mouth of the bag using the bag mouth opening apparatus, filling of the bag with material to be packaged through the elevating hopper using the filling apparatus, and sealing of the mouth of the bag using the sealing apparatus are executed; and in this continuous conveying type bag filling and packaging machine:

the filling apparatus has:

a measuring hopper which is provided above each one of the elevating hoppers, rotates continuously along a second circular path concentric with the first circular path in conjunction with the elevating hopper and in synchronism with the grippers, and has a shutter in a lower portion thereof, a weight detector which is provided so as to correspond to the measuring hopper, rotates continuously in conjunction therewith, and detects a weight of the material to be packaged inside the measuring hopper immediately after the material to be packaged is supplied thereto, and a shutter actuation mechanism which is provided so as to correspond to the measuring hopper, rotates continuously in conjunction therewith, and opens and closes the shutter of the measuring hopper; and a controller is provided which makes determination, based on detection signals from the weight detector, whether the weight of the material to be packaged that is supplied to the measuring hopper is equal to or less than an upper limit value of an allowable range or exceeds the upper limit value, and controls operation of the shutter actuation mechanism associated with the measuring hopper subject to determination in accordance with a result of the determination.

In the above-described continuous conveying type bag filling and packaging machine, it is preferable that:

when determination is made that the weight of the material to be packaged that is supplied to a measuring hopper is equal to or less than the upper limit value, then the controller, while the measuring hopper subject to determination is traveling through a synchronized zone of the second circular path, actuate the shutter actuation mechanism associated with a measuring hopper subject to determination at predetermined timing so as to open the shutter, and when determination is made that the weight of the material to be packaged that is supplied to a measuring hopper exceeds the upper limit value, the controller, while the measuring hopper subject to determination is traveling through the synchronized zone of the second circular path, do not actuate the shutter actuation mechanism associated with the measuring hopper subject to determination so as to maintain the shutter closed.

It should be noted that, the term "synchronized zone" refers to a zone in which the elevating (rising and lowering) hoppers (as well as the measuring hoppers) rotate in synchronism with the grippers along the first and second circular paths.

It is preferable that the above-described continuous conveying type bag filling and packaging machine be provide with a packaged material recovery member, which is provided directly below the elevating hoppers in the synchronized zone of the first circular path and receives material to be packaged that is released from the elevating hoppers.

In the above-described structure, it is preferable that the controller make control in the following manner:

(1) when it is determined that the weight of the material to be packaged that is supplied to a measuring hopper is equal to or less than the upper limit value, the controller, while the measuring hopper subject to determination is traveling through the synchronized zone of the second circular path, actuates the shutter actuation mechanism associated with the measuring hopper subject to determination at predetermined timing so as to open the shutter; and (2) when it is determined that the weight of the material to be packaged that is supplied to the measuring hopper exceeds the upper limit value, the controller:

does not actuate, while the measuring hopper subject to determination is traveling through the synchronized zone of the second circular path, the shutter actuation mechanism associated with the measuring hopper subject to determination so as to maintain the shutter closed;

stops the supply of a bag to the grippers that rotate in synchronism with the measuring hopper which is subject to determination and rotatingly travels through the synchronized zone of the second circular path the next time, stops the supply of the next portion of the material to be packaged to the measuring hopper subject to determination, and actuates, when the measuring hopper subject to determination reaches the synchronized zone of the second circular path the next time, the shutter actuation mechanism associated with the measuring hopper subject to determination at predetermined timing so as to open the shutter.

In the above-described continuous conveying type bag filling and packaging machine, the controller can be set up so that it not only determines, by using detection signals from weight detectors, whether the weight of the material to be packaged that is supplied to a measuring hopper is equal to or less than the upper limit value or exceeds the upper limit value of the allowable range, but it also determine whether it is less than the lower limit value of the allowable range. In such a case, ultimately, three determines are made re:

(a) whether the weight of the material to be packaged that is supplied to a measuring hopper is within the allowable range, (b) whether the weight of the material to be packaged that is supplied to a measuring hopper exceeds the upper limit value of the allowable range, or (c) whether the weight of the material to be packaged that is supplied to a measuring hopper is less than the lower limit value of the allowable range.

If it is determined that the weight is less than the lower limit value of the allowable range, the controller can exercise the same kind of control as that which is done when it is determined that the weight of the material to be packaged that is supplied to the measuring hopper is equal to or less than the upper limit value of the allowable range, or the same kind of control as that which is done when it is determined that the weight exceeds the upper limit value.

The continuous conveying type bag filling and packaging machine according to the present invention is configured such that measuring hoppers provided with shutters are provided above the elevating hoppers; and when the measured amount (weight) of the material to be packaged that is supplied to a measuring hopper exceeds a preset reference value, the shutter is maintained in a closed state and the filling of the bag with the material to be packaged through the elevating hopper is stopped. For this reason, even if an excessive amount of the material to be packaged is supplied to a measuring hopper, it will not be filled into the bag, and problems associated with operational faults in the sealing apparatus or contamination of the bag filling and packaging machine and the production line during the subsequent steps are all able to be proactively prevented.

In addition, the bag filling and packaging machine of the present invention can be set up such that when the measured amount (weight) of the material to be packaged that is supplied to a measuring hopper exceeds a preset reference value, the shutter is opened by actuating the shutter actuation mechanism associated with such a measuring hopper when the measuring hopper subject to determination travels through the filling zone of the second circular path the next time so that the material to be packaged falls through the elevating hopper into the packaged material recovery member. In this configuration, then the elevating hopper and measuring hopper subject to determination can immediately return to make regular (predetermined) packaging operations, making a highly efficient packaging process possible.

DETAILED DESCRIPTION OF THE INVENTION

A continuous conveying type bag filling and packaging machine according to the present invention will be described below with reference to FIGS. 1-5.

Figure 1:
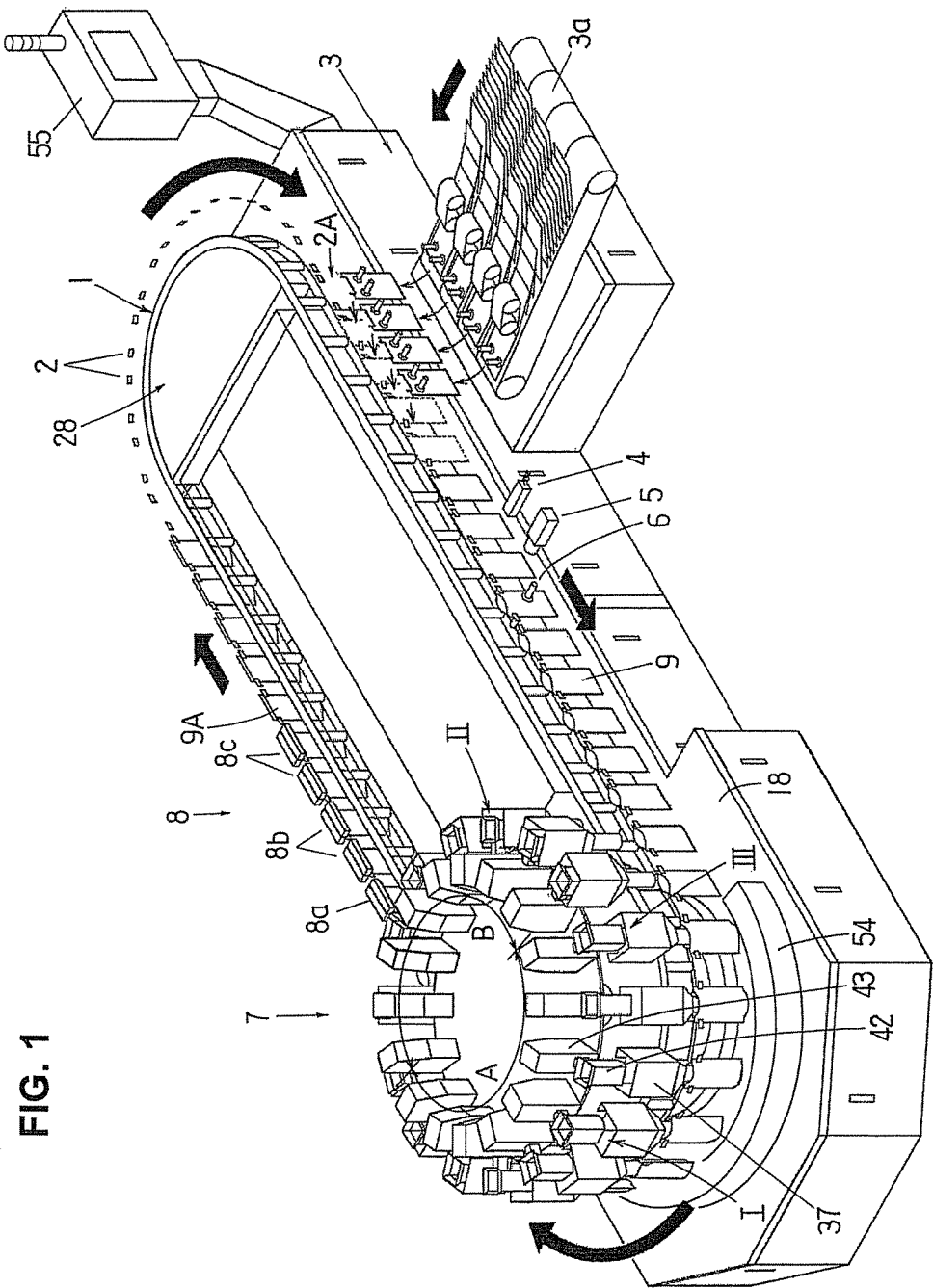
FIG. 1 is an perspective top view of continuous conveying type bag filling and packaging machine according to the present invention.
Figure 2:
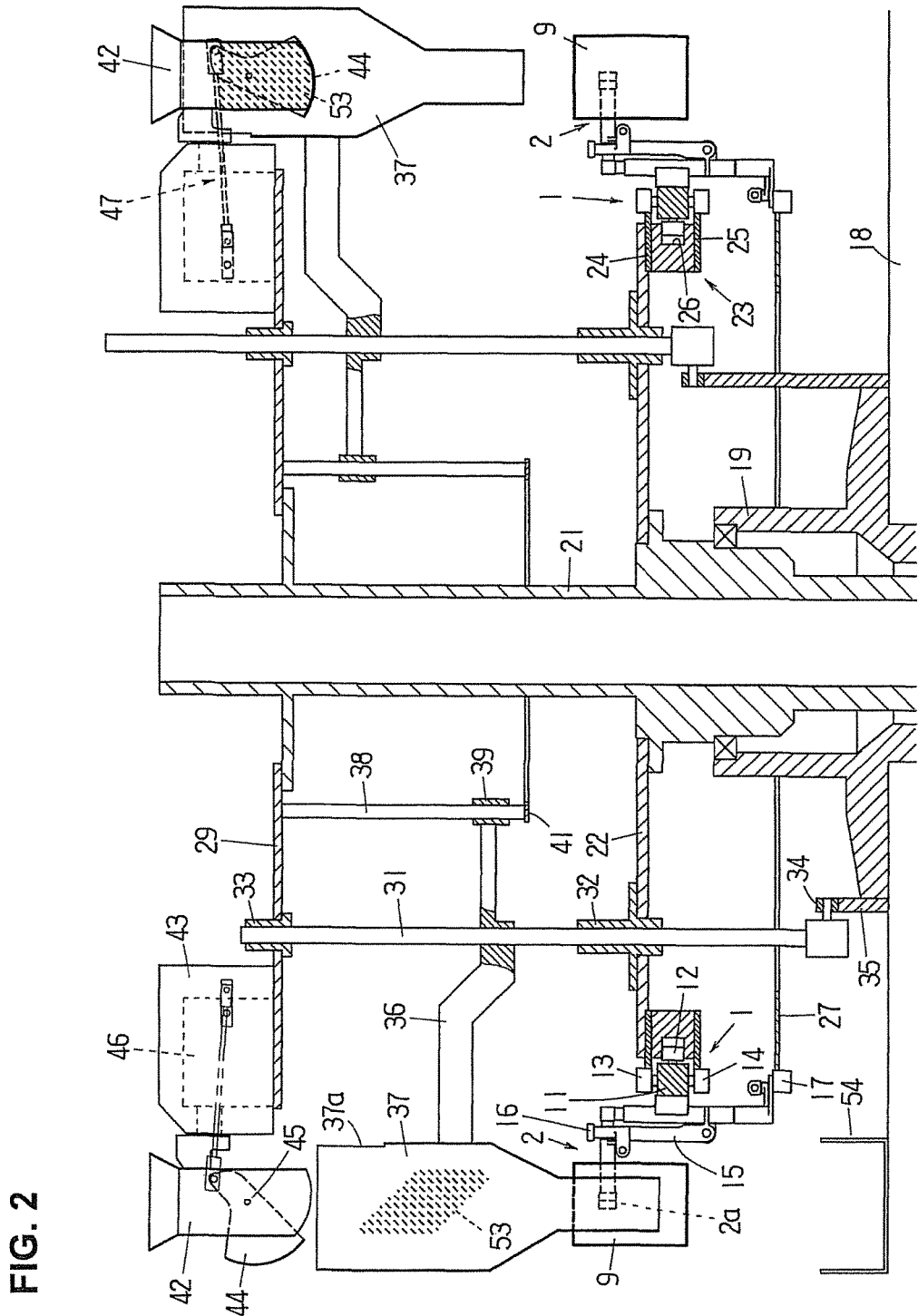
FIG. 2 is a left-side sectional view thereof.

As shown in FIGS. 1 and 2, this continuous conveying type bag filling and packaging machine is provided with an endless chain 1, which travels along a racetrack-shaped annular path, and multiple groups of grippers 2, which are provided at regular intervals in the length direction of the endless chain 1 and similarly travel along the racetrack-shaped annular path in conjunction with the endless chain 1. In addition, a bag supplying apparatus 3, a printer 4, a printed character inspection apparatus 5, a bag mouth opening apparatus (only a suction cup 6 is shown), a filling apparatus 7, a sealing apparatus 8, an empty bag release apparatus (not shown), a product bag discharging apparatus (not shown), and the like are also provided along the annular path of the grippers 2.

As the grippers 2 rotatingly travel along the annular path, the filling and packaging machine performs operations such as supplying of a bag 9 to the grippers 2 using the bag supplying apparatus 3 and holding of both edges of the bag with the grippers 2, printing of a date and time of manufacture on the surface of the bag using the printer 4, inspection of the printed characters using the printed character inspection apparatus 5, opening of the mouth of the bag using the bag mouth opening apparatus, filling of the bag 9 with the material to be packaged using the filling apparatus 7, sealing (including cooling) of the mouth of the bag using the sealing apparatus 8, and discharging of a product bag 9A using the product bag discharging apparatus.

In the same manner as disclosed in Japanese Patent Application Laid-Open (Kokai) No. 2009-161230, the endless chain 1 and the grippers 2, as well as the mechanism that moves the endless chain 1 are the same as the those described in Japanese Patent Application Laid-Open (Kokai) 2002-302227.

The endless chain 1 is made up of multiple links 11 joined together in an endless loop fashion by coupling shafts, not shown. A group of grippers 2 is provided on the outside of each link 11, and an inner guide roller 12 is provided on the inside of each link 11 so as to be rotatable in a vertical plane. An upper guide roller 13 and a lower guide roller 14 are provided at the upper and lower ends of each coupling shaft so as to be rotatable in the horizontal plane.

The grippers 2 have grasping portions 2a, 2a at distal ends of a pair of arms. The grippers 2 hold the bag in a suspended state at its upper two edges with the grasping portions 2a, 2a and continuously travel along a racetrack-shaped annular path. The grasping portions 2a, 2a, urged by a spring, not shown, are normally closed; and they are opened when an open-close lever 15 is moved inward (or when a gating roller 16 at the distal end is pushed inward). In addition, while the grippers 2 travel along the annular path, cam rollers 17 follow spacing adjustment cams (a spacing adjustment cam 27 shown in FIG. 2 is one of the spacing adjustment cams), and the above-described arms are opened and closed (which means the spacing between the grasping portions 2a, 2a changes) in a horizontal plane at predetermined timing.

As shown in FIG. 2, a stand 19 is set upright on the top surface of a mounting block 18, and a hollow shaft 21 is rotatably supported on the stand 19. The hollow shaft 21 is coupled at its lower portion to a drive source, not shown, and is rotated at a constant speed. A drive table 22 is fixedly secured to the hollow shaft 21, and a sprocket 23 is fixedly secured around its periphery. The sprocket 23 has upper and lower gears 24, 25 and an intermediate supporting groove 26. The upper and lower guide rollers 13, 14 of the chain 1 respectively fit within grooves (not shown) formed at regular intervals around the gears 24, 25, and the inner guide roller 12 of each link 11 fits within the supporting groove 26 of the sprocket 23. In addition, the spacing adjustment cams 27 are fixedly provided under the drive table 22, and each cam roller 17 abuts against the outer periphery of the spacing adjustment cam 27.

When the hollow shaft 21 turns and the sprocket 23 rotates (clockwise in FIG. 1 when viewed from above), the endless chain 1, which is stretched between the sprocket 23 and the guide portion of a fixed guide member 28 having a guide portion that is semi-circular when viewed from above, continuously rotates in the horizontal plane along a racetrack-shaped annular path made up of arcuate portions at both ends and linear portions between two arcuate portions. The guide portion of the fixed guide member 28 and the linear sections between two arcuate portions have guide rails (not shown), and the inner guide roller 12 and the upper and lower guide rollers 13, 14 of the endless chain 1 run along these guide rails. In addition, a plurality of spacing adjustment cams (which, in the same manner as the spacing adjustment cam 27, act to open and close the arms of the grippers 2 in the horizontal plane) are provided along the linear portions on both sides, the cam rollers 17 abut these spacing adjustment cams.

In the same manner as in Japanese Patent Application Laid-Open (Kokai) No. 2009-161230, the bag supplying apparatus 3 is the same as that of the empty bag supplying apparatus described in Japanese Patent Application Laid-Open (Kokai) No. 2002-308223. Combined with a conveyor magazine type bag supplying apparatus 3a, the bag supplying apparatus 3 supplies four (4) bags simultaneously to four (4) groups of grippers 2, with one bag per group.

The printer 4 and printed character inspection apparatus 5 are well-known devices, and, in the same manner as in Japanese Patent Application Laid-Open (Kokai) No. 2009-

161230, the bag mouth opening apparatus of the conveying type bag filling and packaging machine of the present invention is the same as the bag mouth opening apparatus described in Japanese Patent Application Laid-Open (Kokai) No. 2002-255119.

The sealing apparatus 8 is made up of two first sealing apparatuses 8a, 8a, each of which effects heat sealing by clamping the mouth of a filled bag 9 with sealing bars (only a pair of sealing bars of one of the two first sealing apparatuses are shown), two second sealing apparatuses 8b, 8b (only a pair of sealing bars of the two second sealing apparatuses are shown), and two seal cooling apparatuses 8c, 8c, which cools the seal by clamping it with cooling bars (only a pair of sealing bars of the two cooling apparatuses are shown). All of these are similar to the sealing apparatus described in Japanese Patent Application Laid-Open (Kokai) No. 2001-72004, which operates by way of following the grippers 2 at the same speed through a predetermined distance, during which time the sealing bars or cooling bars clamp the mouth of the bag 9 and release it, and thereafter returning to its original position. In the shown example, two bags are simultaneously heat sealed by the first sealing apparatuses 8a, 8a, and then simultaneously heat sealed (a second time) by the second sealing apparatuses 8b, 8b, and further simultaneously cooled by the seal cooling apparatuses 8c, 8c.

The product bag discharging apparatus described above is, in the same manner as in Japanese Patent Application Laid-Open (Kokai) No. 2009-161230, the same as the open-close apparatus described in Japanese Patent Application Laid-Open (Kokai) No. 2002-302227 (which is made up of a gating member, a driving mechanism therefor, etc.), and it uses the push portion of the gating member to inwardly push the gating roller 16 of the grippers 2 arriving at a predetermined position and opens the grasping portions 2a, 2a; and as a result of which, the product bag is dropped onto a chute (not shown) and carried out on a carry-out conveyor (not shown). Such an open-close apparatus is also provided at the location of the bag supplying apparatus 3 and opens the grasping portions 2a, 2a when supplying the bags 9 to the grippers 2 (the open-close apparatus being a type simultaneously serving four (4) groups of grippers 2).

The empty bag release apparatus (not shown) is the same as the non-compliant bag discharging apparatus described in Japanese Patent Application Laid-Open (Kokai) No. 2009-161230 and is provided slightly upstream of the product bag discharging apparatus. Operationally, the empty bag release apparatus is the same as the above-described product bag discharging apparatus, and it opens the grasping portions 2a, 2a of the grippers 2 by inwardly pushing the gating roller 16 of the grippers 2, thus allowing the empty bag 9 to drop.

As shown in FIG. 2, an operation table 29 is fixedly secured to the hollow shaft 21 at a position above the drive table 22, and a plurality (16 in this example) of elevating shafts 31 are supported by the respective supporting members 32, 33 so that the tables 22, 29 can make vertical movement. A cam roller 34 is installed at the lower end of each elevating shaft 31. When the elevating shaft 31 rotates following the rotation of the hollow shaft 21 and tables 22, 29, this cam roller 34 rolls upon an annular cam 35 fixedly secured to the outer periphery of the stand 19, such that the elevating shaft 31 is raised and lowered at predetermined timing. When viewed from above, a plurality of elevating shafts 31 are provided on the drive table 22 at regular angular intervals in a circular shape centered on the center of rotation of the drive table 22.

An elevating member 36 is fixedly secured to each elevating shaft 31, and elevating (rising and lowering) hoppers 37 are fixedly secured to the outer end of the elevating member 36. Guide shafts 38 are vertically secured to the bottom surface of the drive table 29 in association with the elevating shafts 31, and sliding members 39, which are fixedly secured to the inner ends of the elevating members 36, slidably fit around the guide shafts 38, thus preventing rotation of the elevating shafts 31 and elevating members 36. When viewed from above, the plural guide shafts 38 are disposed at regular angular intervals in a circular shape centered on the center of rotation of the drive table 29, with their lower ends interconnected by circular linking members 41.

A measuring hopper 42 associated with each of the elevating hoppers 37 is provided at a position directly above the elevating hopper 37, and a measuring box 43 is provided in the peripheral portion of the operation table 29 so as to correspond to each of the measuring hoppers 42. A shutter 44 is provided in the lower portion of each of the measuring hoppers 42 so as to be rotatable about a pivot shaft 45 and to open and close the lower end opening of the measuring hopper 42.

A weight detector (e. g., a load cell type detector) 46, which measures the weight of material to be packaged that is supplied to the measuring hopper 42, is provided inside the measuring box 43, and each measuring hopper 42 is coupled to and supported by the weight detector 46. In addition, a shutter actuation mechanism 47, which opens and closes the shutter 44, is provided in the measuring box 43. The shutter actuation mechanism 47 is made up of an air cylinder (not shown) which is provided inside the measuring box 43, a drive shaft 48, which rotates under the action of the air cylinder, a rocking lever 49, which is fixedly secured to the drive shaft 48, and a coupling rod 51. Both ends of the coupling rod 51 are pin-connected to the rocking lever 49 and the shutter 44. When the air cylinder is actuated, the drive shaft 48 rotates through a predetermined angular range, the coupling rod 51 is advanced and retracted, and the shutter 44 is opened and closed. The reference number 52 is a bracket that is fixedly secured to the measuring hopper 42, and the measuring hopper 42 is coupled to and supported by the weight detector 46 by this bracket 52.

Figure 3:
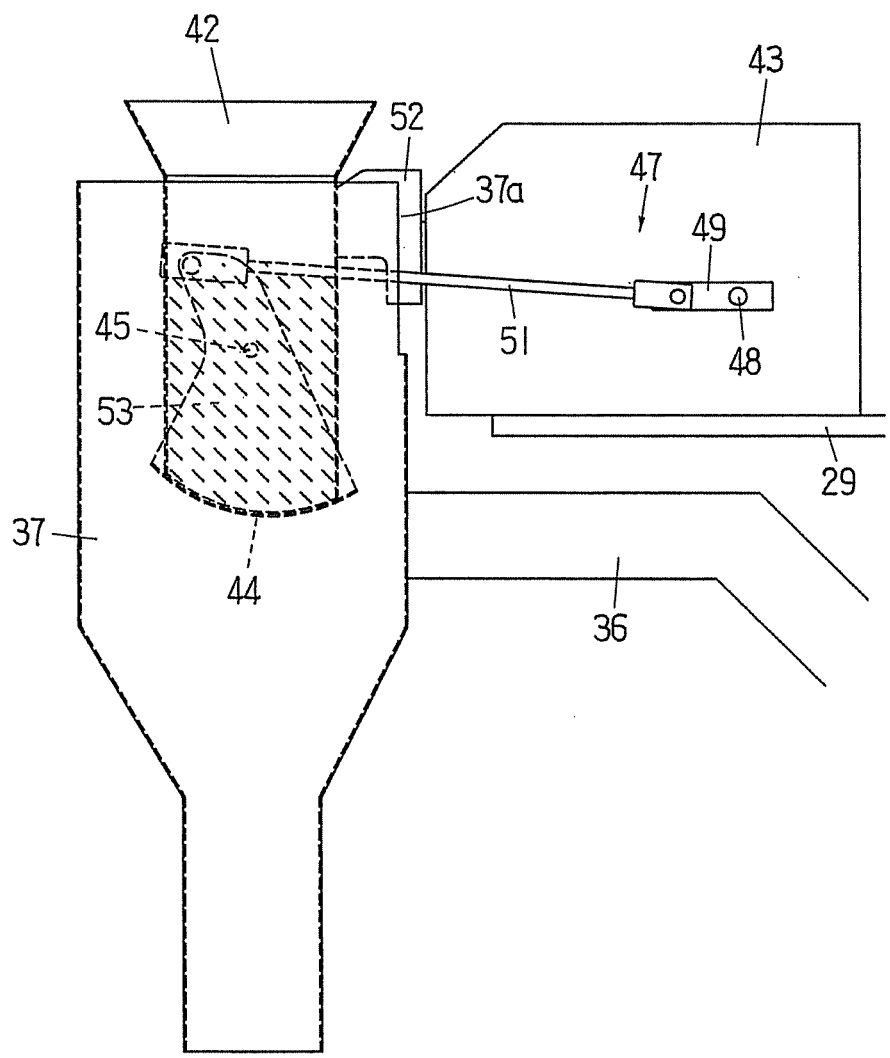
FIG. 3 is an enlarged side view of a measuring hopper (with a shutter closed) and an elevating hopper.
Figure 4:
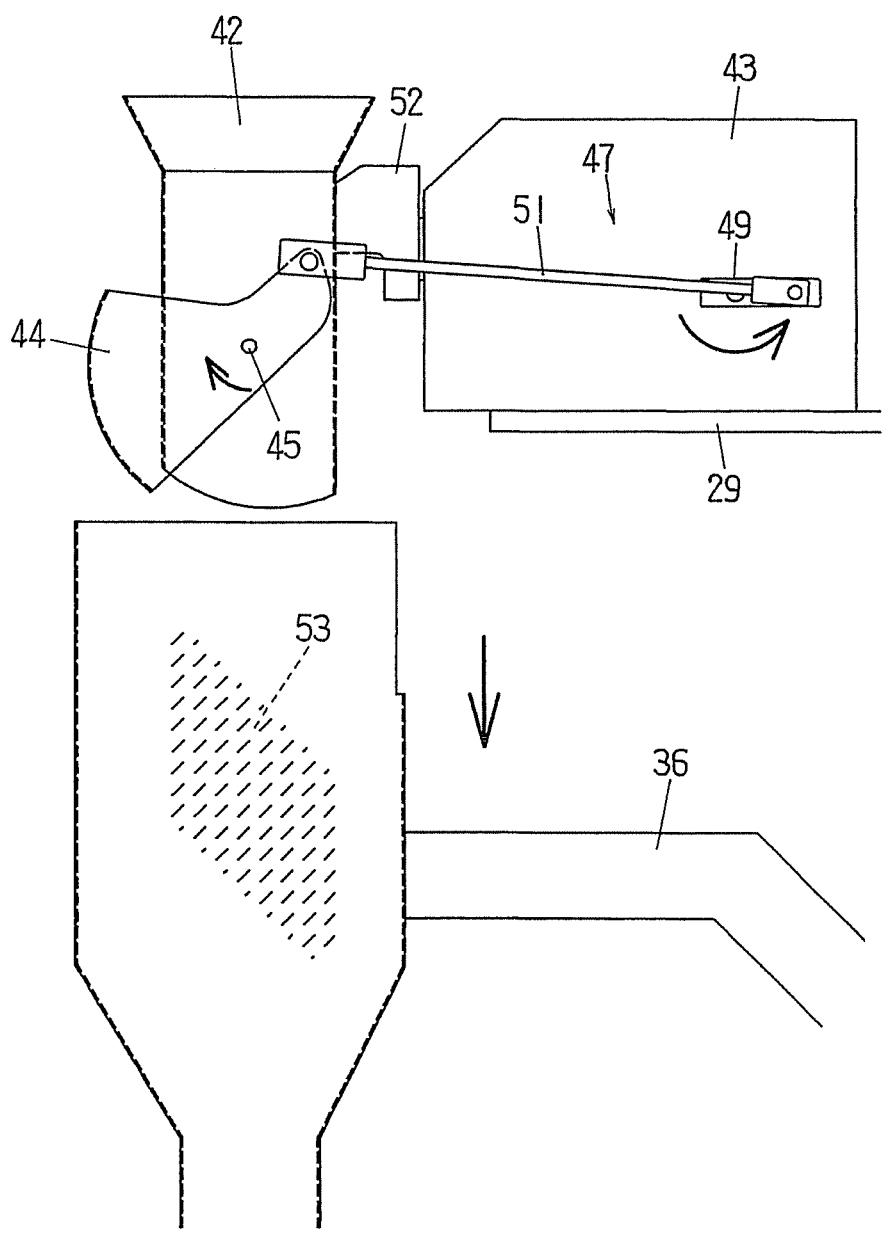
FIG. 4 is an enlarged side view of a measuring hopper (with a shutter opened) and an elevating hopper.

As seen from the right-hand portion of FIG. 2 and from FIG. 3, when the material 53 to be packaged is supplied to the measuring hopper 42 by a material supplying means (part of the filling apparatus), not shown, the elevating hopper 37 is raised and the shutter 44 of the measuring hopper 42 remains in a closed state. At such time, the measuring hopper 42 enters the upper portion of the elevating hopper 37, and the lower end of the elevating hopper 37 is positioned above a bag 9. In addition, as shown in the left-hand portion of FIG. 2 and from FIG. 4, when the shutter 44 opens and the material 53 to be packaged held in the measuring hopper 42 is deposited into the elevating hopper 37, the elevating hopper 37 is lowered. At such time, the measuring hopper 42 is retracted from the elevating hopper 37, and the lower end portion of the elevating hopper 37 is inserted into the bag 9.

When the measuring hopper 42 enters the top portion of the elevating hopper 37, the coupling rod 51 and the bracket 52 on the measuring hopper 42 side enter a cutout 37a formed in the top portion of the sidewall of the elevating hopper 37, thus preventing interference among the constituent elements.

When the hollow shaft 21 rotates, the tables 22, 29 rotate, and the endless chain 1, along with the grippers 2, rotatingly travels along the racetrack-shaped annular path; and in addition, the elevating hoppers 37 and measuring hoppers 42 rotatingly travel along the circular paths (the two circular paths thereof practically overlap when viewed from above; and the circular path of the elevating hoppers 37 is called "first circular path" and the circular path of the measuring hoppers 42 is called "second circular path"). The first and second circular paths are divided into two arcuate zones: a first arcuate zone, where the elevating hoppers 37 and measuring hoppers 42 rotatingly travel along an arcuate (semi-circular) portion of the annular path of the grippers 2, and a second arcuate zone where the elevating hoppers 37 and measuring hoppers 42 rotatingly travel away from the arcuate portion of the annular path of the grippers 2. In the former, first arcuate zone, the elevating hoppers 37 and measuring hoppers 42 rotatingly travel above the grippers 2 in synchronism with the grippers 2, and the elevating hoppers 37 are raised and lowered. In the first and second circular paths, the first arcuate zone where the elevating hoppers 37 and measuring hoppers 42 rotatingly travel along the arcuate portion of the annular path of the grippers 2 is called "synchronized zone" (a zone indicated by the letter "A" in FIG. 1), and the second arcuate zone where they rotatingly travel away from the arcuate portion of the annular path of the grippers 2 is called non-synchronized zone (a zone indicated by the letter "B" in FIG. 1). An arcuate packaged material recovery member 54) is provided along the entire length of this synchronized zone, and it receives material to be packaged dropped from the elevating hoppers 37 (see below for details on how the material to be packaged is dropped).

A step-by-step description of the basic operation of the rotatingly traveling elevating hoppers 37 and measuring hoppers 42 is provided below. All of these operations are controlled by the controller 55.

(a) Measuring the Material to be Packaged

Before the elevating hoppers 37 and measuring hoppers 42, which rotatingly travel along the first and second circular paths, reach the synchronized zone A, a step of supplying the material 53 to be packaged (e. g., granular material) in the non-synchronized zone B is finished, and then a step of measuring is performed in which the weight detector 46 measures (measures the weight of) the material 53 to be packaged that is held in the measuring hopper 42. The shutter 44 of the measuring hopper 42 is closed during the supplying step and measuring step.

(b) Filling a Bag with the Material to be Packaged

When the elevating hopper 37 and measuring hopper 42 reach the synchronized zone A, the elevating hopper 37 and measuring hopper 42 rotate above the corresponding grippers 2 (and the bag 9 held by the grippers 2) in synchronism with the grippers 2 (and the bag 9 held by the grippers 2), and the elevating hopper 37 is immediately lowered so that the lower end portion thereof is inserted into the bag 9. Thereafter, the shutter actuation mechanism 47 operates at predetermined timing to open the shutter 44 of the measuring hopper 42, thereby initiating a filling step. The material 53 to be packaged held in the measuring hopper 42 falls in the filling step into the elevating hopper 37 and fills up the bag 9 (see the left-hand portion of FIG. 2). This filling step completes before the elevating hopper 37 and measuring hopper 42 reach the non-synchronized zone B.

(c) Supplying the Material to be Packaged

Before the filling step is completed, the shutter actuation mechanism 47 operates in reverse, and the shutter 44 is closed, and then the material supplying means of the filling apparatus 7 starts supplying of the material 53 to be packaged to the measuring hopper 42. Even after the shutter 44 has been closed, part of the filling step (the filling of the bag 9 with the material 53 to be packaged from the elevating hopper 37) still continues. This supplying step is completed before the start of the measuring step.

In addition to controlling the basic operations (a)-(c) above, the controller 55 performs the following control based on the detection signals received from the weight detectors 46.

(1) If, based on the detection signal, it is determined that the weight of the material 53 to be packaged that is supplied to the measuring hopper 42 is within the allowable range, then the basic control described in (a)-(c) above is applied to the measuring hopper subject to determination and to members related thereto.

(2) If, based on the detection signal, it is determined that the weight of the material 53 to be packaged that is supplied to the measuring hopper 42 is less than the lower limit value of the allowable range, then, in the same manner as in (1) above, the basic control described in (a)-(c) above is applied to the measuring hopper subject to determination and to members related thereto. Since in this case the product bag 9A (the filled bag) is a non-compliant bag having therein insufficient contents, it is removed during the subsequent steps.

(3) If, with the items (1) and (2) above being combined, it is determined that the weight of the material 53 to be packaged that is supplied to the measuring hopper 42 is equal to or less than the upper limit value of the allowable range, such a basic set-up control as described in paragraphs (a)-(b) above can be applied to the measuring hopper that is subject to determination and to members related thereto.

(4) If it is determined that, based on the detection signal, the weight of the material 53 to be packaged that is supplied to the measuring hopper 42 exceeds the upper limit value of the allowable range, then the shutter 44 of the measuring hopper 42 subject to determination is kept closed during the filling step described in (b) above, thereby preventing the material 53 to be packaged from being released. However, the efficiency of packaging by the bag filling and packaging machine decreases if the material 53 to be packaged is indefinitely kept in the closed measuring hopper 42; accordingly, when the measuring hopper 42 makes a single revolution and travels through the synchronized zone A once again or the next time, the shutter 44 is opened so that the material 53 to be packaged is released through the elevating hopper 37 into the packaged material recovery member 54, where it is recovered, and the filling and packaging machine subsequently goes back to the basic control operations described in (a)-(c) above. In this case, it is preferable that the material supplying means of the filling apparatus 7 and the bag supplying apparatus 3 be controlled such that the supply of the next portion of the material to be packaged to the measuring hopper 42 that is subject to determination is stopped, and the supply of bags 9 to the grippers 2, which are supposed to rotate in synchronism when the measuring hopper subject to determination 42 rotatingly travels through the synchronized zone A of the second circular path the next time, is also stopped.

Figure 5:
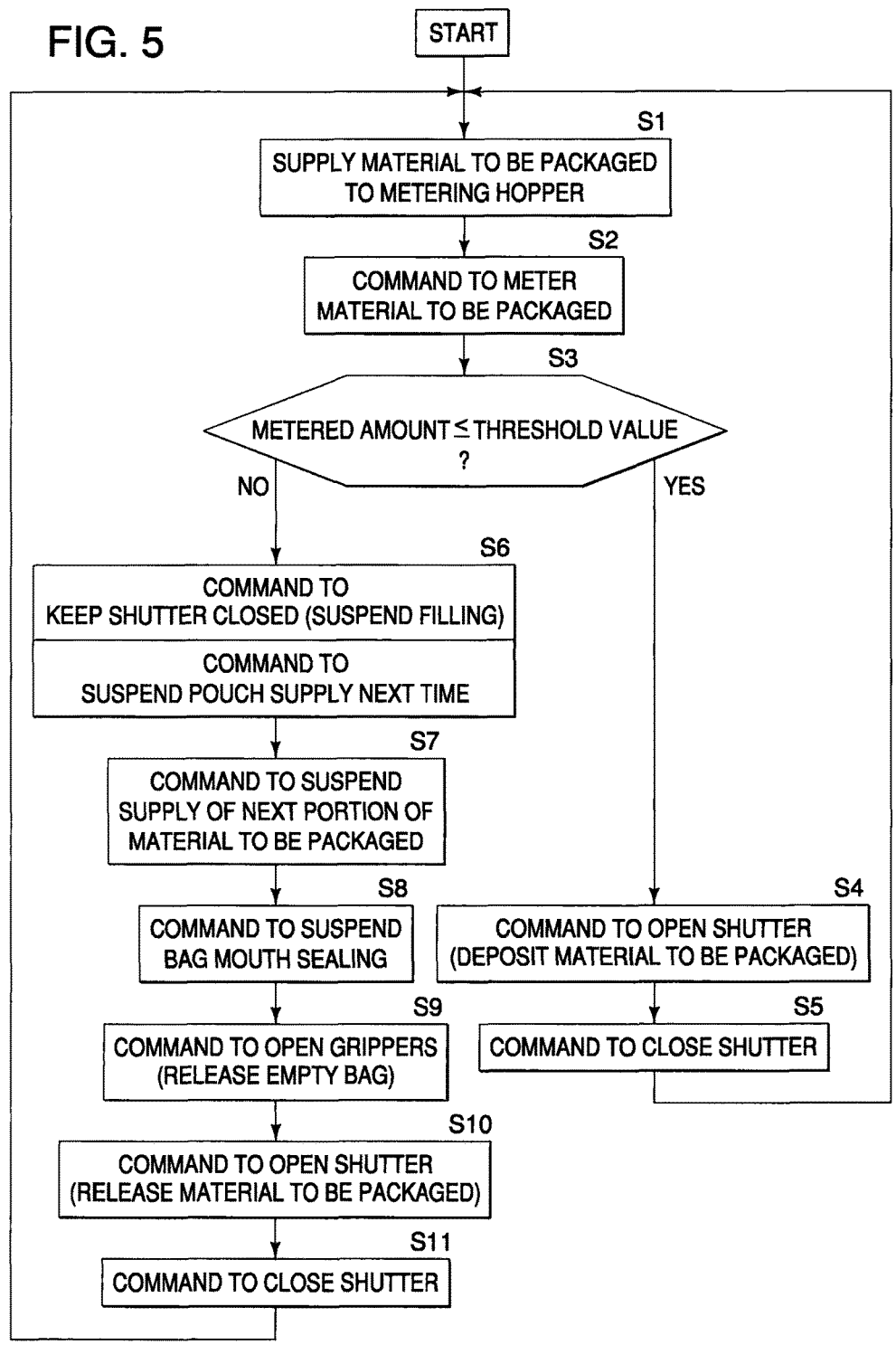
FIG. 5 is a flowchart of control steps executed by detection signals received from a weight detector.

Next, the specific control steps executed by the controller 55, in particular, the control operations (3) and (4) above, will be described with reference to the flowchart of FIG. 5.

Step S1

The supply of the material 53 to be packaged to the measuring hopper 42 by the material supplying means, not shown, of the filling apparatus 7 is initiated when the measuring hopper 42, which rotatingly travels along the second circular path, reaches the supplying step initial position (the location indicated by arrow I in FIG. 1) in the synchronized zone A.

Step S2

When the measuring hopper 42, which rotatingly travels along the second circular path, reaches the measuring step initial position (the location indicated by arrow II in FIG. 1) in the non-synchronized zone B, a command to measure the material 53 to be packaged is issued to the weight detector 46, and the measuring step is initiated, so that a detection signal is immediately transmitted from the weight detector 46 to the controller 55. The measuring step initial position II is also the final position of the supplying step.

Step S3

The detection signal received from the weight detector 46 is used to compare the weight (measured amount) of the material 53 to be packaged that is supplied to the measuring hopper 42 and the upper limit value (threshold) of the allowable range that is preset in the controller 55 in order to determine whether the measured amount exceeds the upper limit value or is equal to or less than the upper limit value.

Step S4

If it is determined that the measured amount is equal to or less than the upper limit value, the shutter 44 of the measuring hopper 42 is opened when the measuring hopper subject to determination 42 reaches the filling step initial position (the location indicated by arrow III in FIG. 1) in the synchronized zone A as it rotatingly travels along the second circular path.

Step S5

When the measuring hopper 42 subject to determination reaches the supplying step initial position I as it rotatingly travels along the second circular path, the shutter 44 is closed. Even after the shutter 44 is closed, the material 53 to be packaged held in the elevating hopper 37 continues to be filled into the bag 9.

Step S6

If it is determined that the measured amount exceeds the upper limit value, when the measuring hopper 42 subject to determination reaches the filling step initial position III as it rotatingly travels along the second circular path, a command to suspend filling is issued to the shutter actuation mechanism 47, and the shutter 44 of the measuring hopper 42 subject to determination is maintained in a closed state. At the same time, a command to suspend bag supply is issued to the bag supplying apparatus 3, and the supply of bags 9 to the grippers 2 supposed to rotate in synchronism when the measuring hopper 42 subject to determination rotatingly traveling through the synchronized zone A of the second circular path the next time (indicated by arrow 2A in FIG. 1) is stopped. Furthermore, a command to suspend bag mouth opening, a command to suspend the printing of characters on the bags held by the grippers 2 (which they are actually not holding bags), and a command to suspend printed character inspection are issued to the bag mouth opening apparatus (only a suction cup 6 is shown), printer 4, and printed character inspection apparatus 5.

Step S7

When the measuring hopper 42 subject to determination reaches the supplying step initial position I as it rotatingly travels along the second circular path, a command to suspend the supply of the material 53 to be packaged is issued to the material supplying means of the filling apparatus 7, and the supply of the next portion of the material 53 to be packaged to the measuring hopper 42 is suspended.

Step S8

When the grippers 2 associated with the measuring hopper 42 subject to determination (the grippers 2 that have been rotatingly traveling in synchronism with the measuring hopper subject to determination 42) reach the position of the bag mouth sealing step (the position where the sealing apparatus 8 is located), a command to suspend bag mouth sealing is issued to the sealing apparatus 8, so that the operation of bag mouth sealing is prevented from being performed on the bag 9 (an empty bag that has not been filled with the material 53 to be packaged) held by the grippers 2.

Step S9

When the grippers 2 associated with the measuring hopper 42 subject to determination (the grippers 2 that have been rotatingly traveling in synchronism with the measuring hopper subject to determination 42) reach the position of the empty bag release step (the position where the empty bag release apparatus is located), an empty bag release command is issued to the empty bag release apparatus, and the grasping portions 2a, 2a of the grippers 2 are opened, and the bag 9 held thereby (an empty bag that has not been filled with the material 53 to be packaged) is released.

Step S10

When the measuring hopper subject 42 to determination reaches the filling step initial position III once again as it makes a single revolution along the second circular path, a command to release the material to be packaged is issued to the shutter actuation mechanism 47, and the shutter 44 of the measuring hopper 42 is opened; as a result, the previously supplied material 53 to be packaged held in the measuring hopper 42 is released into the packaged material recovery member 54 through the elevating hopper 37. In this case, the grippers 2, which travel in synchronism with this measuring hopper 42, are not holding a bag 9.

Step S11

When the measuring hopper 42 subject to determination reaches the supplying step initial position I as it rotatingly travels along the second circular path, the shutter 44 is closed. Even after the shutter 44 is closed, the material 53 to be packaged inside the elevating hopper 37 continues to be released into the packaged material recovery member 54.

The invention claimed is:

1. A continuous conveying type bag filling and packaging machine comprising:
   multiple groups of grippers that are provided at regular intervals and travel at a constant speed along a race-track-shaped annular path, and
   further, among others, a bag supplying apparatus, a bag mouth opening apparatus, a filling apparatus, and a sealing apparatus, which are provided along the annular path, wherein
   said filling apparatus is comprised of a plurality of elevating hoppers that are provided, above an arcuate portion on one side of the annular path, at regular intervals along a first circular path concentric with the arcuate portion and that continuously rotate in synchronism with the grippers, and
   during travel of the grippers, packaging operations including, among others, supplying of a bag to the grippers using the bag supplying apparatus and gripping of two edges of the bag with the grippers, opening of a mouth of the bag using the bag mouth opening apparatus, filling of the bag with material to be packaged through the elevating hopper using the filling apparatus, and sealing of the mouth of the bag using the sealing apparatus are executed;

said continuous conveying type bag filling and packaging machine:

further comprising, as part of said filling apparatus, a measuring hopper which is provided above each one of the elevating hoppers, rotates continuously along a second circular path concentric with the first circular path in conjunction with the elevating hopper and in synchronism with the grippers, and has a shutter in a lower portion thereof, wherein each elevating hopper is vertically moved towards and away from its respective measuring hopper, a weight detector which is provided so as to correspond to the measuring hopper, rotates continuously in conjunction therewith, and detects a weight of the material to be packaged inside the measuring hopper after the material to be packaged is supplied thereto, and a shutter actuation mechanism which is provided so as to correspond to the measuring hopper, rotates continuously in conjunction therewith, and opens and closes the shutter of the measuring hopper to deposit the material to be packaged into the elevating hopper; and further comprising a controller which makes determination, based on detection signals from the weight detector, whether the weight of the material to be packaged that is supplied to the measuring hopper is equal to or less than an upper limit value of an allowable range or exceeds the upper limit value, and controls operation of the shutter actuation mechanism associated with the measuring hopper subject to determination in accordance with a result of the determination, wherein (1) when determination is made that the weight of the material to be packaged that is supplied to the measuring hopper is equal to or less than the upper limit value, the controller, while the measuring hopper subject to determination is traveling through a synchronized zone of the second circular path, actuates the shutter actuation mechanism associated with the measuring hopper subject to determination at predetermined timing so as to open the shutter; and (2) when determination is made that the weight of the material to be packaged that is supplied to the measuring hopper exceeds the upper limit value, the controller:

does not actuate, while the measuring hopper subject to determination is traveling through the synchronized zone of the second circular path, the shutter actuation mechanism associated with the measuring hopper subject to determination so as to maintain the shutter closed;

stops the supply of the bag to the grippers that rotate in synchronism with the measuring hopper which is subject to determination and rotatingly travels through the synchronized zone of the second circular path the next time, stops the supply of a next portion of the material to be packaged to the measuring hopper subject to determination, and actuates, when the measuring hopper subject to determination reaches the synchronized zone of the second circular path a next time, the shutter actuation mechanism associated with the measuring hopper subject to determination at predetermined timing so as to open the shutter.

2. The continuous conveying type bag filling and packaging machine according to claim 1, wherein said controller makes determination, based on detection signals from the weight detector, whether the weight of the material to be packaged that is supplied to a measuring hopper is within the allowable range, exceeds the upper limit value of the allowable range, or is less than a lower limit value of the allowable range, and controls, based on a result of the determination, the operation of the shutter actuation mechanism associated with the measuring hopper subject to determination.

3. The continuous conveying type bag filling and packaging machine according to claim 1 or 2, wherein a packaged material recovery member, which receives material to be packaged that is released from the elevating hoppers, is provided at a position directly below the elevating hoppers in the synchronized zone of the first circular path.

* * * * *